July 5, 1932.  F. RITTER, JR  1,866,487
DEVICE FOR SQUEEZING SEGMENTAL FRUIT SLICES
Filed July 30, 1931
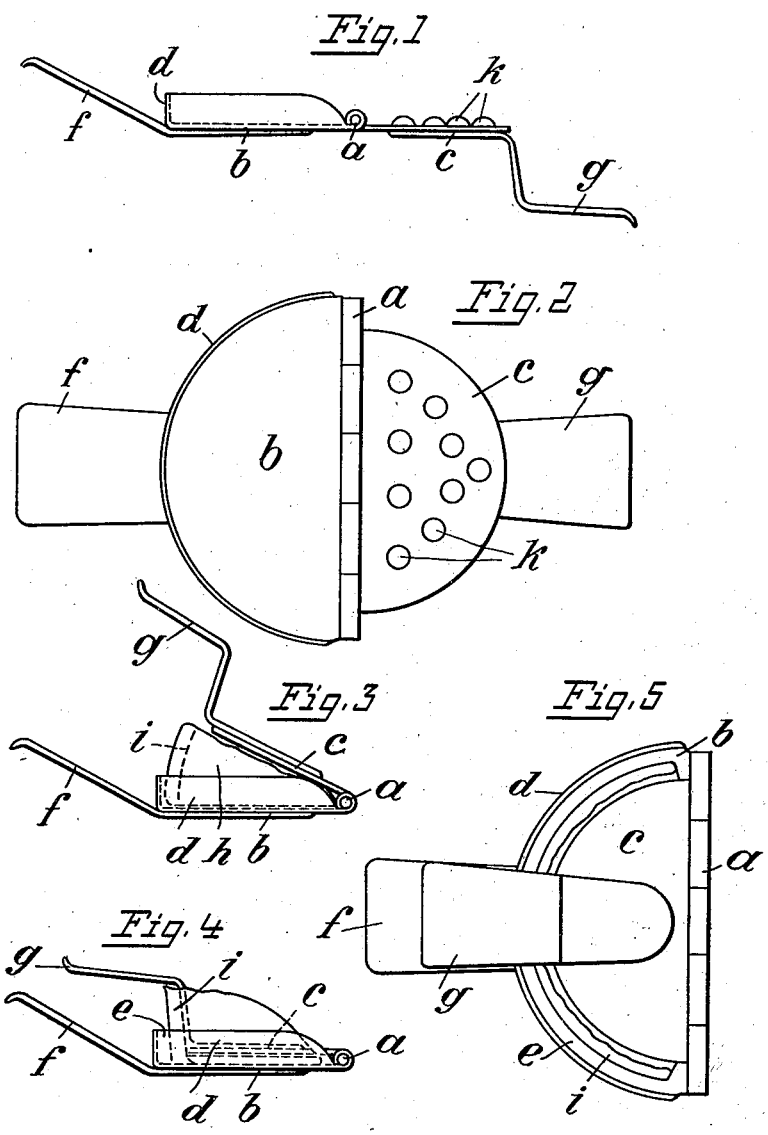
Inventor:
Franz Ritter, Jr.
by Richard E. Babcock
Attorney Patented July 5, 1932

1,866,487

UNITED STATES PATENT OFFICE

FRANZ RITTER, JR., OF PASING-MUNICH, GERMANY, ASSIGNOR TO THE FIRM F. RITTER & SOHN, OF PASING-MUNICH, BAVARIA, GERMANY

DEVICE FOR SQUEEZING SEGMENTAL FRUIT SLICES

Application filed July 30, 1931, Serial No. 554,091, and in Germany May 14, 1930.

Patent applications have been filed in the following foreign states: Germany, Serial 34b R. 88.30, filed May 14, 1930 (not yet granted); Austria, filed May 12, 1931; Norway, Serial No. 48,054/31, filed May 12, 1931; Netherlands, Serial No. 56,809, filed May 13, 1931; Switzerland, Serial No. 83,069, filed May 13, 1931; Spain, Serial No. 122,874, filed May 13, 1931; England, Serial No. 14,240/31, filed May 14, 1931; Italy, Serial No. 141/106, filed May 13, 1931; Hungary, Serial No. 8,209, filed May 13, 1931; Jugoslavia, Serial No. 8,939, filed May 13, 1931; Belgium, Serial No. 298,276, filed May 13, 1931; Denmark, Serial No. 927/31, filed May 13, 1931; Czechoslovakia, filed May 13, 1931; France, Serial No. 315,460, filed May 13, 1931; Sweden, Serial No. 2069/31, filed May 13, 1931.

The present invention relates to devices for squeezing the juice out of segmental slices of fruit such as lemons or oranges.

Devices are already known for this purpose which consist of two segmental pressure plates of substantially semi-circular base which are hinged together at their free edges whilst short extensions are provided on the curved edges of the two pressure plates for use as handles when pressing.

These devices have the disadvantage that the pressure acts on the entire slice of lemon or orange inserted in a folded state between the pressure plates, that is to say it also acts on the peel of the slice, which peel hinders the pressing process to a certain degree. It is not therefore possible to completely press all the juice out of the fruit slice. There is also the disadvantage that by squeezing peel along with the pulp the bitter constituents of the peel are mixed with the juice and spoil the taste thereof.

These disadvantages are eliminated according to the present invention in that the curved edge of one pressure plate is bent up to form a flange or rim which runs concentrically to the curved edge of the other pressure plate which is smaller than the first-mentioned plate by an amount corresponding at least to the thickness of the peel.

The bent-up flange of the larger pressure plate serves in known manner during the squeezing process as a support for the slice of lemon or orange whilst the outer surface of the fruit peel lies against the flange which is substantially vertical to the plate. The pressure plate which is smaller by at least the thickness of the peel merely acts on the fruit pulp leaving a sufficient intermediate space for the fruit peel and squeezes all the pure juice out of the pulp without the peel interfering with the pressing process. The handle provided on the curved edge of the smaller pressure plate is according to the invention cranked upwardly to form a Z corresponding to the thickness of the fruit folded slice so that no pressure action is exerted on the peel by the handle.

One form of construction of the invention is shown by way of example in the accompanying drawing in which:

Figure 1 is an elevation of the device when fully open.

Figure 2 is a plan view corresponding to Fig. 1.

Figure 3 shows the device with a slice of lemon inserted therein before squeezing.

Figure 4 shows the same device with a slice of lemon located therein after squeezing.

Figure 5 is a plan view corresponding to Fig. 4.

The device consists of two segment-shaped pressure plates $b$ and $c$ of substantially semi-circular base pivotally connected together by a hinge $a$. The curved edge of the larger pressure plate is bent up perpendicularly to the plane of the plate to form a vertical flange or rim $d$. The other pressure plate $c$, provided with small studs $k$, is so much smaller that an intermediate space $e$ is left between its curved edge and the flange $d$ of the larger plate $b$ as can be seen from the plan view in Fig. 5, the breadth of this space being at least equal to the usual thickness of the peel of, for instance, a lemon or orange. A handle $f$ or $g$ is secured to each of the two pressure plates. The handle $g$ of the smaller plate $e$ is cranked upwardly in the form of a Z.

The manipulation of the pressing or squeezing device of the present invention is as follows:

A segment-shaped slice $h$ of fruit such as lemons or oranges is laid between two pressure plates $b$ and $c$ in the manner shown in Fig. 3 in such a way that the peel $i$ is located in the intermediate space remaining between the curved edge of the plate $c$ and the vertical edge $d$ of the plate $b$. Then the pressure plates are pressed together by means of the two handles $f$ and $g$ (Figs. 4 and 5) whereby the pulp of the fruit can gradually be completely squeezed. It is not possible for the fibres of the fruit pulp or the pips to escape. The peel $i$ remains in position during the pressing process. It is almost completely freed from the fruit pulp without preventing the pressing process and without being itself squeezed out with the pulp.

I claim:

1. A device for squeezing segmental slices of fruit such as lemons or oranges comprising a pair of segmental pressure plates pivoted together at their straight edges, one of the said plates having an upright rim at its curved side, the said rim being throughout distant from the curved edge of the other pressure plate by an amount at least equal to the thickness of the peel at the curved edge of the segmental slice of fruit to be squeezed.

2. A device for squeezing segmental slices of fruit such as lemons or oranges comprising a segmental pressure plate having an upright rim along its curved side, a handle extending from the curved side of said pressure plate, a second segmental pressure plate hinged along its straight side to the straight side of said first-mentioned pressure plate and of smaller dimensions than said first-mentioned pressure plate by an amount corresponding at least to the thickness of the peel of the fruit slice and a Z-like cranked handle extending from the curved side of said smaller pressure plate, the cranked portion of said handle overtopping the thickness of the fruit slice to be squeezed.

In testimony whereof I have signed my name to this specification at Munich, Germany, this 9th day of July, 1931.

FRANZ RITTER, Junior.